US009430802B2

(12) United States Patent
Beerse et al.

(10) Patent No.: US 9,430,802 B2
(45) Date of Patent: Aug. 30, 2016

(54) METHOD AND PROCESS FOR COLLABORATIVELY BUILT CONTENT FILTERING

(71) Applicant: International Business Machines Corporation, Armonk, NY (US)

(72) Inventors: Chelsea C. Beerse, Fairport, NY (US); Patrick J. O'Sullivan, Dublin (IE); Jeffrey B. Sloyer, Cary, NC (US); Carol S. Zimmet, Boxborough, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 259 days.

(21) Appl. No.: 13/804,389

(22) Filed: Mar. 14, 2013

(65) Prior Publication Data

US 2014/0280536 A1 Sep. 18, 2014

(51) Int. Cl.
| | | |
|---|---|---|
| *G06F 15/16* | (2006.01) | |
| *G06Q 50/00* | (2012.01) | |
| *H04L 29/08* | (2006.01) | |
| *H04W 4/20* | (2009.01) | |

(52) U.S. Cl.
CPC .............. *G06Q 50/01* (2013.01); *H04L 67/22* (2013.01); *H04W 4/206* (2013.01)

(58) Field of Classification Search
CPC ..... G06Q 50/01; H04L 51/32; H04N 21/254
USPC .......................... 709/203–209, 224; 707/758
See application file for complete search history.

(56) References Cited

U.S. PATENT DOCUMENTS

| | | | |
|---|---|---|---|
| 7,323,999 B2 | 1/2008 | Heidloff et al. | |
| 7,584,171 B2 | 9/2009 | Guan et al. | |
| 7,634,546 B1 * | 12/2009 | Strickholm et al. | 709/207 |
| 8,209,384 B2 | 6/2012 | Tom et al. | |
| 8,676,913 B1 * | 3/2014 | Roche et al. | 709/206 |
| 8,763,087 B2 * | 6/2014 | Athsani et al. | 726/4 |
| 8,775,527 B2 | 7/2014 | O'Sullivan et al. | |
| 2004/0267596 A1 | 12/2004 | Lind et al. | |
| 2008/0010258 A1 | 1/2008 | Sureka | |
| 2008/0141146 A1 | 6/2008 | Jones et al. | |
| 2009/0144780 A1 | 6/2009 | Toebes et al. | |
| 2010/0191694 A1 | 7/2010 | Pan et al. | |
| 2010/0313250 A1 * | 12/2010 | Chow | 726/5 |
| 2011/0125697 A1 * | 5/2011 | Erhart et al. | 706/47 |
| 2012/0020647 A1 * | 1/2012 | Vogel | 386/251 |

(Continued)

OTHER PUBLICATIONS

Saleem, "Collaborative Filtering: Lifeblood of The Social Web" Collaborative Filtering: http://www.readwriteweb.com/archives/collaborative_filtering_social_web.php, Jun. 30, 2008.

Wikipedia, the free encyclopedia, "Collaborative filtering" Collaborative Filtering, Wikipedia: http://en.wikipedia.org/wiki/Collaborative_filtering.

(Continued)

*Primary Examiner* — Saket K Daftuar
(74) *Attorney, Agent, or Firm* — Dermott Cooke; Michael A. Petrocelli

(57) ABSTRACT

A method and system for collaborative content filtering on a communications network includes monitoring social networking communications of a plurality of users on a communications network using a program. The method and system further include selecting a filter parameter by a user. The content of the social networking communications is filtered based on the filter parameter including parsing input from the users, using the program. The filtered content is identified to at least one user.

15 Claims, 2 Drawing Sheets

(56) References Cited

U.S. PATENT DOCUMENTS

| | | | | |
|---|---|---|---|---|
| 2012/0331063 A1* | 12/2012 | Rajaram | ............... | 709/206 |
| 2013/0054699 A1* | 2/2013 | Macaskill | ............... | 709/204 |
| 2013/0262592 A1* | 10/2013 | DeLuca et al. | ............... | 709/206 |
| 2013/0326375 A1* | 12/2013 | Barak et al. | ............... | 715/758 |
| 2014/0156681 A1* | 6/2014 | Lee et al. | ............... | 707/754 |
| 2014/0201227 A1* | 7/2014 | Hamilton-Dick et al. | ............... | 707/758 |
| 2014/0289389 A1* | 9/2014 | George et al. | ............... | 709/224 |
| 2014/0324570 A1* | 10/2014 | Lawrence | ............... | 705/14.44 |

OTHER PUBLICATIONS

Cohen, "Collaborative Filtering: A Tutorial", Center for Automated Learning and Discovery, Carnegie Mellon University www.cs.cmu.edu/~wcohen/collab-filtering-tutorial.ppt.

Disclosed Anonymously, "System for Collecting, Aggregating, and Managing Community-Sourced Ratings Data for Entities Which Evolve OverTime", IP.com, No. 000207114, Electronic Publication Date: May 17, 2011, pp. 1-5.

* cited by examiner

METHOD AND PROCESS FOR COLLABORATIVELY BUILT CONTENT FILTERING

FIELD

The present disclosure relates to a method and system for content filtering of communications by multiple users on a communications network.

BACKGROUND

Collaborative exchanges by multiple users of a forum accessible by a computer or personal data assistant (PDA) using a communications network, may include, on-line chat groups, blogs, e-mails, instant messaging between users, document libraries, and social networking websites accessible using the Internet. Such communications may include options to manage the messaging or chat between users, such as categorizing or labeling messages. The collaborative exchanges may result in extensive collaborative content which can be stored.

One difficulty for users engaging in social communications is, whether contemporaneously or over time, the information exchanges may exceed the user's capacity to review and understand the content, as well as exceed the user's ability to maintain interaction. Current attempts to manage contemporaneous or gathered content include, labeling content, flagging content, or categorizing content. One disadvantage of such techniques is that they require extensive labor on the part of the user.

Therefore, there is a need in the art for providing a method and system for organizing social communications with minimal time and effort. It would also be desirable for a method to manage content in one or more social exchanges and/or conversations with multiple users on a communications network, in an efficient manner.

BRIEF SUMMARY

According to an aspect of the invention, a method for collaborative content filtering on a communications network includes: monitoring social networking communications of a plurality of users on a communications network using a program, the program being executable by a processor of a computer; selecting a filter parameter; filtering content in the social networking communications based on the filter parameter, the filtering including parsing input from the users, using the program; and identifying the filtered content to at least one user.

According to another aspect of the invention, a system for collaborative content filtering on a communications network includes a communications network having social networking communications for a plurality of users. The social networking communications are monitorable using a program executable by a processor of a computer. A filter parameter is selectable by a user of the plurality of users. Filtered content from the social networking communications based on the filter parameter, the filtered content at least in part based on parsed input from the users, using the program. An identification of the filtered content to at least one user.

According to another aspect of the invention, a computer program product for collaborative content filtering on a communications network includes the computer program product having a program embodied in a computer readable storage medium. The program has code executable by a processor to perform a method. The method comprises: monitoring social networking communications of a plurality of users on a communications network using a program, the program being executable by a processor of a computer; selecting a filter parameter; filtering content in the social networking communications based on the filter parameter, the filtering including parsing input from the users, using the program; and identifying the filtered content to at least one user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
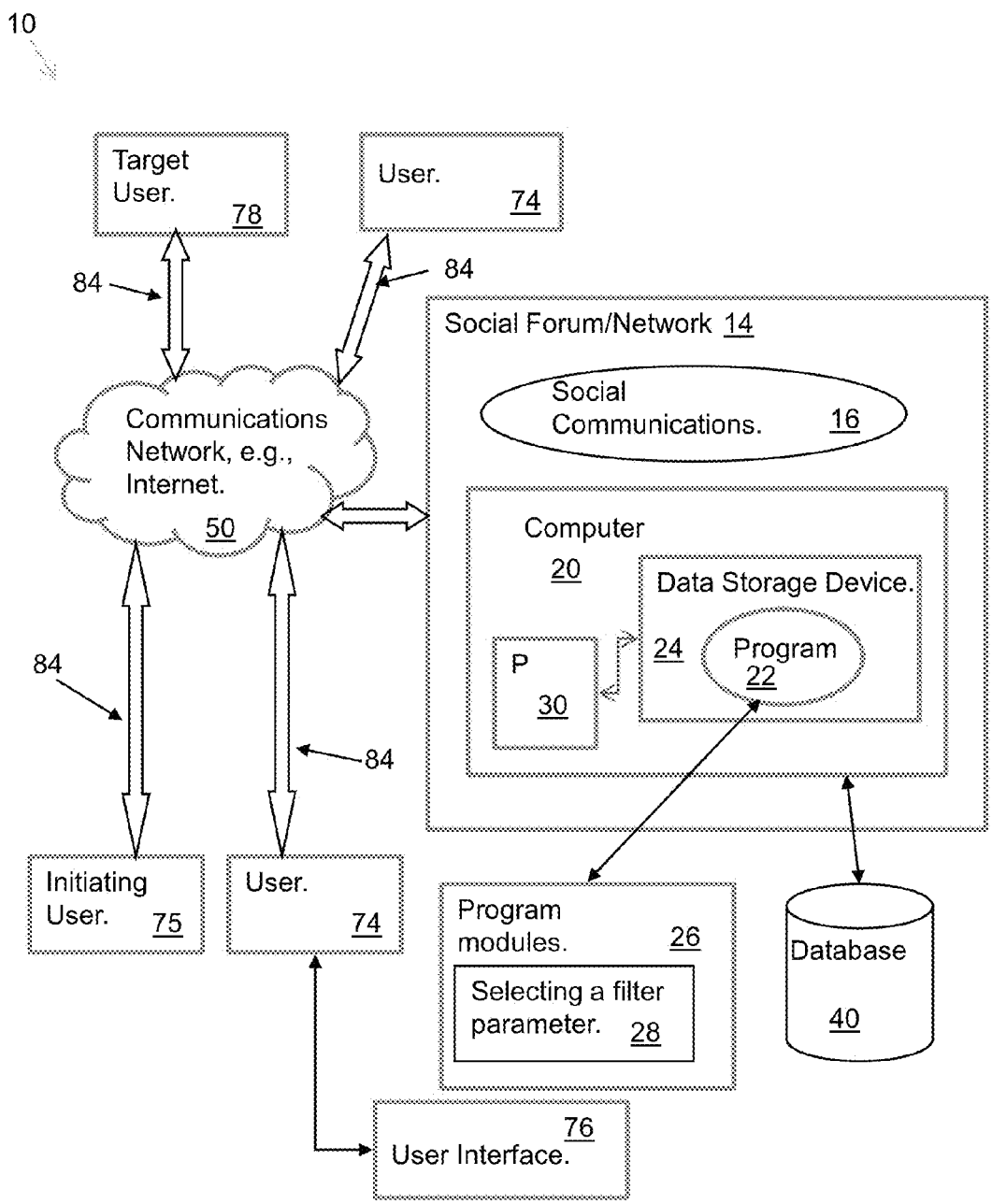
FIG. 1 is a schematic block diagram illustrating an overview of the system and methodology for content filtering in a communications network.
Figure 2:
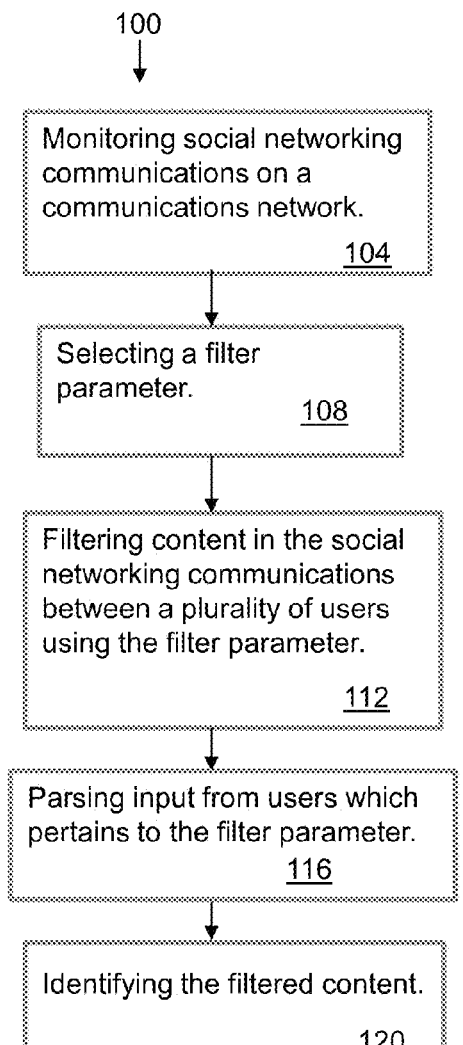
FIG. 2 is a flow chart of a method according to an embodiment of the invention.
Figure 3:
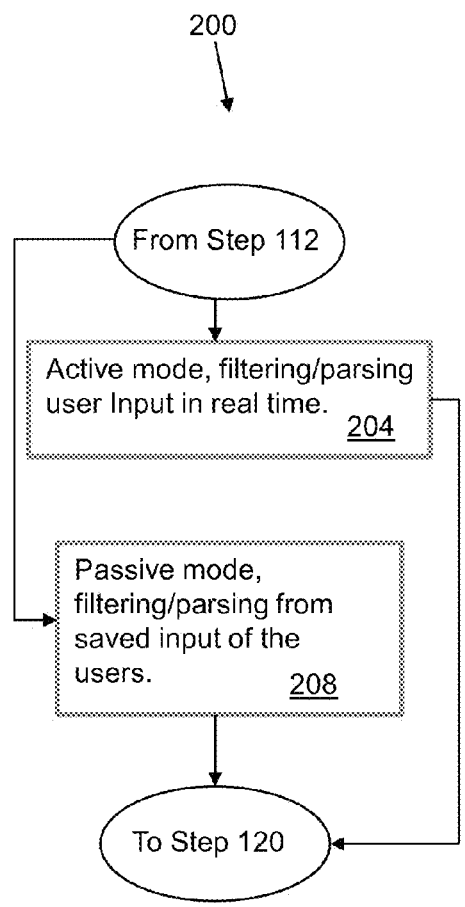
FIG. 3 is an optional continuation of the flow chart shown in FIG. 2, according to an embodiment of the invention.

Referring to FIGS. 1 and 2, a system 10 and method 100 according to an embodiment of the disclosure for collaborative content filtering includes a communications network 50, which may be embodied as the Internet. A program 22 is used to monitor social communications 16 in a social forum/network 14 by multiple users on a social network 14 using the communications network 50. The social network 14 may be a website on one or more host servers accessible via the Internet by multiple users. The social communications 16 may include conversations between multiple users using personal data assistants (PDAs), or computers, which facilitate communications using texting, messaging, postings on social websites, posting on blogs, and the like. The users and their computer device are generically represented as user nodes 74, representatively including a user interface 76 as a keyboard, touch screen, PDS, etc. The program 22 may be embodied on a data storage device or medium, such as a hard drive, flash drive, etc., and is executable by a processor 30 of a computer 20 to perform the method 100. Additional data may be stored in a database 40 communicating with the computer 20. The method steps and system features may be embodied in modules of the program 22 for performing the steps of the method, which modules are generically represented in FIG. 1 as program modules 26.

In step 104 of the method 100, the method monitors communications of the social network 14 on the communications network 50 using the program 22. Step 108 includes selecting a filter parameter by one of the multiple users, who may be referred to as an initiating user 75. The selection of the filter parameter may include one or more users. The collaborative feedback from a multiplicity of users can be used to assess, that is, filter, content for users. For example, a filter may include rules for matching suggested topics for a target user 78 (of the users 74) by another user 74, or quantifying a number of hits by a target user, in addition to suggested topics for a target user to conclude that content will be identified for the target user. The filter parameter, or the step of selecting a filter parameter may be represented as a program module 28, for example, as a filter parameter module of the program 22. The filter parameter module may include multiple filter parameters intended for multiple users. The filter parameter may include selecting a topic of conversation, or specific content in the communication between two or more of the multiple users. The filter parameter may include selecting existing content in a conversation, or indicating content to be filtered in the conversation between users.

The user may also indicate which user the filtered content will be accessible to, that is, a target or a targeted user 78. The filtered identified content may be immediately available for a target users viewing, or be available for later viewing by the target user. The target may be one of the users, i.e., a person, or a group, a subscriber, a participant, a receiver, a member, or an entity, place, or thing.

Step 112 includes filtering content in the social networking communications between the plurality of users using the filter parameter. The program detects the filter parameter in the social communications by the users. The detection of the filter parameter can be by, for example, recognition of key words to detect a designated topic of conversation. Detecting the filter parameter may be automatically implemented after a user selects the filter parameter. The detection may continue until the user deselects the filter parameter. The detection of the filter parameter may continue in real time as the social communications continue, or may search a past store of communications/conversations, for example, communications/conversations stored in a database 40. Step 116 includes parsing the input from the users which pertains to the filter parameter from step 108, which may be done as part of the filtering step 112. The input from the users may be conversations, messaging, texting, etc. The user input may also include preferences indicated by a user, or preferences indicated by a user for another user.

In one example, multiple users may be creating content on many topics that may be short term, long term, and/or unrelated. A short term topic may include, for example, instant messaging which is short lived, for example, an hour, and a long term topic may include, for example, messages that extend over days, or a topic that is returned to over a period of multiple days. The present method 100 may use a dynamic environment as above to filter and identify the created content which is of interest to a user. Additionally, a user can filter content based on a period of time, or events having a period of time. For example, the user can indicate content for filtering using the filter parameter, for example, indicating that for the next four months the user is interested in a topic, after which, the user is not interested in the topic. Such a time period or time limit can be specified within a filter parameter module (generically represented as program module 26, in FIG. 1). Other filtering parameters may include content belonging to a specified online social group or communication, or content about or from a location, building, geography, or corporate policy.

Step 120 includes identifying the filtered content to a user. The identification may include using a visual identification such as, highlighting, a color, or background changes such as shading or color, a pointer, a flag, or message about the filtered content. The filtered content may be presented or indicated to other users or a target user during a conversation by one or more of the sample identifiers above. Alternatively, the filtered content may be presented to other user or a target user concurrently with a conversation, or after a conversation by being separately presented to the user, for example, by a text message or on-line message for current or future review by the non initiating user or a target user. In one instance, identified content may be presented to a user who is invited to a chat, that is currently not participating. In another embodiment, filtered content may be presented to a user along with an annotation from the initiating user, which may include a message or note attached to the identified context. In the present disclosure, all the content of the one or more communications are available to the user, e.g., on a computer or PDA, with filtered content identified. This is in contrast to a system that may filter the content to only present a portion of the total communications.

In one embodiment of the disclosure, a method 200 may continue from step 112 and includes an active mode where the step of parsing input from the users is performed in real time, as in step 204. The method 200 may include a passive mode where the step of parsing input from the users is from saved input data, as in step 208. The input from the users may be conversations, messaging, indicated preferences, texting, etc., in the active mode analyzed in real time, and in the passive mode analyzed from saved input data. The data may be saved, for example, in the database 40. The steps 204 and 208 of method 200 continue to step 120 of method 100.

The method 100 can automatically monitor content or topics selected by an initiating user using the filter parameter, and filter the communications to present the filtered content to one or more of the users or a target user. The initiating user may select the filter parameter by selecting content of the communication or conversation, such as a word, or term used in the conversation. The initiating user may also select a topic which may then be filtered from the conversation by monitoring the communication for a specific term or related term to the topic. Content may also be filtered by selecting a filter parameter which is directed to a threshold frequency of a topic used in an existing conversation or for future conversations. The filtered content can be identified for a plurality of users when the threshold frequency is reached. The social communications or conversations may include, text messaging, emailing, or posting messages on a social networking board. The filtered content may be presented to a user using a display connected to a computer system, or displayed on a PDA. Identifying the filtered content includes marking the identified content using, for example, highlighting using color or font, pointers, or flags when displaying the identified content.

The system 10 and method 100 can detect content that is of interest to a recipient, as specified in the filter parameter by an initiating user, and alert the targeted user by providing an indication to the user with the identified filtered content. The identification can be a marker on, or attached to the content, for example, highlighting or a pointer. Thus, a unique marker or identification is shown on the target user's display. The identification could be presented to multiple users or all of the users. Alternatively, the identified content can be used to invite a user to chat, that is currently not participating.

Thereby, the disclosed system and method screens content in collaborative social communications, and alerts respective parties when there is content that is of interest to them. The filtering may be implemented in real-time, or when a filtering parameter is detected. The present disclosure enables relevant content based on a filtering parameter to be identified in a collaborative exchange, which may be in real-time. The collaborative exchanges may be stored, and may include many different threads. Based on content that is stored in a central repository, which was created in a collaborative manner, the system and method 100 is able to identify content posted of interest, that is, based on the filtering parameter.

The following example further elucidates the present disclosure, for instance, an additional user may attend a group chat where exchanges are fast regarding content topics, and posting speed, wherein the user is not able to keep up as a reader and responder. The present disclosure enables the content to be filtered, and identifies which content is of interest to the additional user.

In another example, a first user may be part of a task force to recommend tasks for adoption within a project. The present method can be used for the first user to filter content and identify the filtered content that is relevant and available within an organization and outside on the World Wide Web.

In another example, a first user may be newly joining a project or team and newly registering in the social network. Using the method 100, the first user's manager may filter content of the social network to filtering content for the first user's responsibilities and/or content which helps in learning, to bring the new user up to speed.

While embodiments of the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

Therefore, one or more Figures described herein may illustrate a schematic of an embodiment of the disclosure and may include a representative computer system or processing system that may implement a method and a program in one or more embodiments of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with one or more processing systems in the present disclosure may include, but are not limited to, personal computer systems, server computer systems, handheld or laptop devices, multiprocessor systems, microprocessor-based systems, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units, a system memory, and a bus that couples various system components including system memory to processor. Computer system may include a variety of computer system readable media. Such media may be any available media that is accessible by computer system, and it may include both volatile and non-volatile media, removable and non-removable media. System memory 58, shown in FIG. 1, can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices such as a keyboard, a pointing device, a display, etc.; one or more devices that enable a user to interact with computer system; and/or any devices (e.g., network card, modem, etc.) that enable computer system to communicate with one or more other computing devices. Such communication can occur via Input/Output (I/O) interfaces. Additionally, computer systems can communicate with one or more networks such as a local area network (LAN), a general wide area network (WAN), and/or a public network (e.g., the Internet) via network adapter. As depicted, network adapter communicates with the other components of computer system via bus. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

Additionally, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Further, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams as may be illustrated in the one or more Figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments, features, and instructive examples described above are illustrative, and should not be construed to limit the present disclosure to the particular embodiments or enumerated examples. Thus, various changes and modifications may be effected by one skilled in the art without departing from the spirit or scope of the disclosure as defined in the appended claims.

What is claimed is:

1. A computer implemented method for collaborative content filtering on a communications network, comprising:
   monitoring social networking communications of a plurality of users on a communications network using a program, the program being executable by a processor of a computer;
   receiving, using the computer, filter parameters from an initiating user of the plurality of users, the filter parameters include identifying content of communication content of the social networking communications and a target user of the plurality of users to be presented the identified content, the initiating user selecting a content topic from the social networking communications for filtering;
   filtering, using the computer, the identified content in the communication content of the social networking communications based on the filter parameters, the filtering including parsing input from the users, using the program; and
   visually identifying, using the computer, the filtered identified content for the target user within the communication content and without excluding any of the communication content, the visual identification of the filtered identified content includes displaying the filtered identified content using a designation;
   the filtering the identified content in the communication content of the social networking communications further includes: an active mode wherein the parsing of the input from the users is in real time; a passive mode wherein the parsing of the input from the users is from saved inputs from the users; and
   the filter parameters include detecting a threshold frequency of a topic, and identifying the topic for a plurality of users when the threshold frequency is reached.

2. The method of claim 1, further comprising monitoring selections of topics of the plurality of users; and
   automatically selecting the filter parameters based on the selections of topics of the plurality of users.

3. The method of claim 2, wherein the automatically selecting the filter parameters includes determining a frequency of the topics selected in the social networking communications.

4. The method of claim 1, wherein the input from the users includes electronic conversations between the users, and flagged content identified by one or more users.

5. The method of claim 1, wherein the filter parameters include detecting the threshold frequency for a plurality of topics in the social networking communications, and the visually identifying the filtered identified content includes an order of priority of the plurality of topics based on the threshold frequency.

6. A computer system for collaborative content filtering on a communications network, which comprises:
   one or more computer processors, one or more computer-readable storage media, and program instructions stored on one or more of the computer-readable storage media for execution by at least one of the one or more processors, the program instructions, comprising:
   monitoring social networking communications of a plurality of users on a communications network using a program, the program being executable by a processor of a computer;
   receiving, using the computer, filter parameters from an initiating user of the plurality of users, the filter parameters include identifying content of communication content of the social networking communications and a target user of the plurality of users to be presented the identified content, the initiating user selecting a content topic from the social networking communications for filtering;
   filtering, using the computer, the identified content in the communication content of the social networking communications based on the filter parameters, the filtering including parsing input from the users, using the program; and
   visually identifying, using the computer, the filtered identified content for the target user within the communication content and without excluding any of the communication content, the visual identification of the filtered identified content includes displaying the filtered identified content using a designation;
   the filtering the identified content in the communication content of the social networking communications further includes: an active mode wherein the parsing of the input from the users is in real time; a passive mode wherein the parsing of the input from the users is from saved inputs from the users; and
   the filter parameters include detecting a threshold frequency of a topic, and identifying the topic for a plurality of users when the threshold frequency is reached.

7. The system of claim 6, wherein a filter parameter module of the program monitors selections of topics of the plurality of users, and selects the filter parameters based on the selections of topics of the plurality of users.

8. The system of claim 7, wherein the filter parameter module selects the filter parameters which includes determining a frequency of the topics selected in the social networking communications.

9. The system of claim 6, wherein the filter parameters include detecting the threshold frequency for a plurality of topics in the social networking communications, and the visual identification of the filtered identified content includes an order of priority of the plurality of topics based on the threshold frequency.

10. A computer program product for collaborative content filtering on a communications network, the computer program product including a program embodied in a non-transitory computer readable storage medium, the program having code being executable by a processor to perform a method, comprising:

monitoring social networking communications of a plurality of users on a communications network using a program, the program being executable by a processor of a computer;

receiving filter parameters from an initiating user of the plurality of users, the filter parameters include identifying content of communication content of the social networking communications and a target user of the plurality of users to be presented the identified content, the initiating user selecting a content topic from the social networking communications for filtering;

filtering the identified content in the communication content of the social networking communications based on the filter parameter, the filtering including parsing input from the users, using the program; and identifying the filtered identified content for the target user within the communication content and without excluding any of the communication content, the visual identification of the filtered identified content includes displaying the filtered identified content using a designation;

the filtering the identified content in the communication content of the social networking communications further includes: an active mode wherein the parsing of the input from the users is in real time; a passive mode wherein the parsing of the input from the users is from saved inputs from the users; and the filter parameters include detecting a threshold frequency of a topic, and identifying the topic for a plurality of users when the threshold frequency is reached.

11. The method of claim 1, wherein the initiating user identifies the content and the target user during the social networking communication, and the visually identifying the filtered content for the target user occurs during the social networking communication; and the method further comprising:

presenting to the target user, the identified filtered content in real-time during the social networking communication.

12. The method of claim 1, wherein the initiating user identifies content of the social networking communications and a contact to be presented the identified content, the contact not being one of the plurality of users of the social networking communications; and the method further comprises:

presenting the identified content to the contact.

13. The method of claim 1, wherein the initiating user selects the target user.

14. The method of claim 1, wherein the initiating user annotates the identified content being presented to the target user.

15. The method of claim 14, wherein the annotation is attached to the identified context, and the annotation is about the filtered identified content.

* * * * *